United States Patent [19]

Ausprung

[11] Patent Number: 4,630,957
[45] Date of Patent: Dec. 23, 1986

[54] BALL CUP FOR A BALL BEARING

[75] Inventor: Erich Ausprung, Geislingen, Fed. Rep. of Germany

[73] Assignee: Springfix-Befestigungstechnik GmbH, Salach, Fed. Rep. of Germany

[21] Appl. No.: 486,323

[22] Filed: Apr. 19, 1983

[30] Foreign Application Priority Data

May 19, 1982 [DE] Fed. Rep. of Germany ....... 3218962

[51] Int. Cl.⁴ .............................................. F16C 11/00
[52] U.S. Cl. ..................................... 403/76; 403/122; 403/375
[58] Field of Search ................. 403/142, 122, 115, 90, 403/77, 76, 10, 141, 135, 143, 321, 375, 166, 309, 302, 300

[56] References Cited

U.S. PATENT DOCUMENTS

| | | | |
|---|---|---|---|
| 213,400 | 3/1879 | Ditsworth | 403/166 |
| 1,334,518 | 3/1920 | Burgess | 403/141 |
| 2,791,454 | 5/1957 | Saives | 403/122 |
| 3,224,801 | 12/1965 | Price-Stephens et al. | 403/122 |
| 4,084,913 | 4/1978 | Schenk | 403/316 |
| 4,111,570 | 9/1978 | Morel | 403/321 |
| 4,144,831 | 3/1979 | Heydolph | 403/166 |
| 4,200,405 | 4/1980 | Bauer | 403/142 |

Primary Examiner—Cornelius J. Husar
Assistant Examiner—Peter M. Cuomo
Attorney, Agent, or Firm—Anthony A. O'Brien

[57] ABSTRACT

There is disclosed a ball cup for a ball bearing with a shaft and with a hollow space for the reception of a ball head accessible by way of an entrance opening, in the case of which at a distance from the wall of the hollow space at least two slits are provided symmetrically in relation to the hollow space and essentially in longitudinal direction of the shaft in such a way that in the case of the introduction of the ball head through the introducing opening into the hollow space, the bridges located between the wall of the hollow space and the slits may be shifted to the outside in a radial direction based on the bridges narrowing the entrance opening and that they will again shift in a radial direction inward after introduction of the ball head into the hollow space. The bridges are developed as an annular restriction disposed symmetrically to the hollow space and they comprise the slits, the annular restriction and the hollow space essentially centrically so far and are disposed at such a distance from the annular restriction, that the bridges on the basis of their strength have a flexibility absorbing the extension of the annular restriction in radial direction transversely to the direction of the shaft as well as along the direction of the shaft.

3 Claims, 5 Drawing Figures

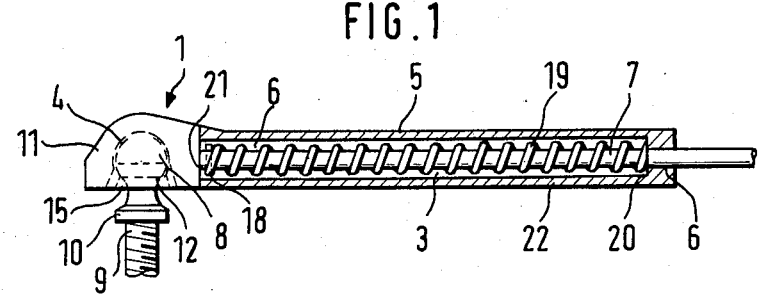
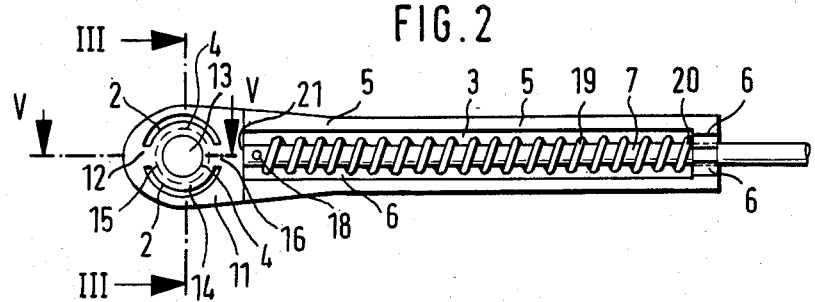
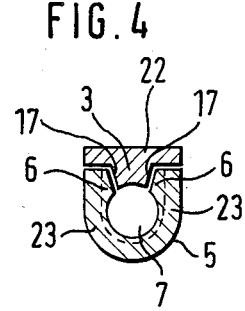
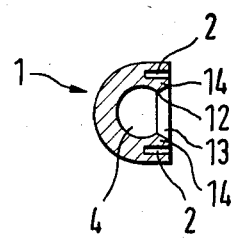
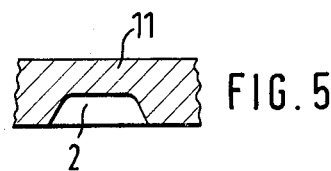

BALL CUP FOR A BALL BEARING

BACKGROUND OF THE INVENTION

1. Field of the Invention

The present invention relates to a ball and socket joint construction and, in particular, to a ball cup for the ball bearing.

2. Description of the Prior Art

The prior art which reveals numerous and various types of ball and socket constructions, is generally exemplified by German Utility Pat. No. 80 31 790. One of the problems associated with prior art constructions is that the ball cup must have an entrance opening large enough to permit entry of the ball into the ball cup, must have some means for retaining the ball in the ball cup, and must have some means to permit release of the ball from the ball cup. The mechanisms for accomplishing these three functions have been found to be complex, cumbersome, expensive to manufacture and complicated to operate.

OBJECTS OF THE INVENTION

It is an object of the present invention to construct a ball cup for a ball bearing, which is simple in structure, economical to manufacture and easy to operate.

The present invention has another object in that the construction of the ball cup permits retention of the ball bearing without the use of extraneous devices.

Another object of the present invention is that a ball cup is provided with an annular restriction that will expand radially upon ingress of a ball bearing and will thereafter contract to retain the ball bearing in the cup.

SUMMARY OF THE INVENTION

The present invention is summarized in a ball cup for a ball bearing with a shaft and with a hollow space for the reception of a ball head accessible by way of an entrance opening, in which, distanced from the wall of the hollow space, at least two slits are symmetrically arranged in the hollow space and in a longitudinal direction of the shaft in such a way that upon introduction of the ball head through the entrance opening into the hollow space causes bridges located between the wall of the hollow space and the slits to shift to narrow the entrance in a radial direction outwardly and, after introduction of the ball head into the hollow space to shift again in a radial direction inwardly, characterized in that the bridges terminate in annular restriction disposed symmetrically in relation to the hollow space and in that the slits encircle the annular restriction and the hollow space concentrically and at a distance from the annular restriction so that the bridges on the basis of their length have a flexibility absorbing the expansion of the annular restriction in a radial direction transversely to the direction of the shaft as well as along the direction of the shaft.

Other objects and advantages will become apparent from the following description taken in conjunction with accompanying drawing.

BRIEF DESCRIPTION OF THE DRAWING

FIG. 1 in a partial side elevation view with parts in cross section of a ball cup and ball arrangement and embodying the present invention.

FIG. 2 is a top plan view of FIG. 1.

FIG. 3 is a cross-sectional view taken along line III—III of FIG. 2.

FIG. 4 is a front elevation view of the shaft of the ball cup of FIG. 1.

FIG. 5 is a partial cross-sectional view taken along line V—V of FIG. 2.

DESCRIPTION OF THE PREFERRED EMBODIMENT

In order to provide the ball cup with a support secured against any dropping out of the ball, the entrance opening to the hollow space of the ball cup has two opposing projections in the shape of ribs running essentially in the longitudinal direction of the shaft. Beside these ribs, slits are provided in the material of the ball cup likewise running essentially in the longitudinal direction of the shaft which take care that in the case of the introduction of the ball head into the hollow space or in the case of its removal from the hollow space, the bridges remaining between the slits and the ribs may escape radially to the outside.

The present invention is based on the task of improving the reliability of the support of the ball head in the ball cup. According to the invention, this will be accomplished by the fact that the projections are developed as an annular restriction arranged symmetrically to the hollow space and in that the slits encompass the annular restriction and the hollow space essentially symmetrically so far and are disposed at such a distance from the annular restriction that the bridges have a stretchability absorbing the expansion of the annular restriction in radial direction transversely to the direction of the shaft as well as along the direction of the shaft.

As a result of the symmetrical restriction of the entrance opening in the shape of the annular restriction, it is necessary in the case of introducing as well as in the case of taking out the ball head, to apply a considerable force, which leads to the fact that the ball head can be removed from the ball cup practically only by means of a tool. The securing of the holding of the ball head in the ball cup is thus in the position of transmitting considerable forces without there being any danger that during this process, the ball head would slip out of the ball cup. Contrary to the ribs provided in the case of the known ball cup, which need merely to escape radially to the side whenever the ball head is inserted, the annular restriction must be able to expand in the manner of a ring. In order to give this possibility to the annular restriction, the slits disposed laterally beside it are guided centrically at a considerable length around the annular restriction. Thus relatively long bridges result between the annular restriction and the slits which in their area practically constitute the annular restriction and which have sufficient stretchability on the basis of their length in order to make possible a radial escape of the annular restriction transversely to the direction of the shaft as well as along the direction of the shaft. In this case, one must take into consideration that the material of the annular restriction lying between the ends of the slits is only little stretchable because of its connection with the material of the ball cup. On the one hand this leads to the fact that the ball head is held particularly securely in the ball cup and on the other hand that the ball cup is in a position to transmit tensile and compression forces acting in the longitudinal direction of the shaft on the ball head projecting approximately perpendicularly from the ball cup without elasticity which is particularly desirable.

In order to furthermore meet the danger in the case of the previously described ball cup that, because of the exertion of particularly great forces, the ball head will be torn out of the ball cup, it is possible to shape the ball cup effectively in such a way that the shaft is provided with a longitudinally directed trough-shaped recess at the end of which facing away from the cup head, a restriction is provided in such a way that a bar inserted into the recess will be held in engagement by the restriction, whereby the restriction constitutes a stop for a spiral spring carried by the bar in the area of the restriction, which spiral spring has its opposite end engaging an abutment disposed at the end of the bar. As a result of the spiral spring with its mounting, one will ascertain that a tension force acting on the ball cup which in this connection in most cases is particularly important, may then be absorbed by the spiral spring whenever the tension force exceeds the compression force inherent in the spiral spring. In this case, the abutment does indeed press so strongly on the spiral spring that the latter is compressed while being supported by the stop, as a result of which a load possibly harmful to the ball cup will be absorbed by the spiral spring. Such an arrangement makes sense above all in those cases, where the ball cup is provided in the transmission of power of the gas pedal of a motor vehicle in the case of which the ball cup is loaded for tension as a result of stepping down on the gas pedal. Whenever then the ball cup is held fast by a stop, but the gas pedal still has clearance for movement, under the action of the considerable force applicable by the driver with his leg, a construction part in the pertinent system of the power transmission may be damaged. This can be avoided by the action of the spiral spring as a longitudinal compensation.

In order to additionally safeguard the mounting of the bar in the recess, the recess is closed effectively by a lid which is attached to the walls enclosing the recess.

The previously described ball cup may be attached to both ends of a connecting member which always continues axially in the shaft of the pertinent ball cup.

In order to shift the stretchability of the bridges essentially to their surface area which will benefit the strength of the connection between the ball cup and the ball head, the slits will be shaped effectively in such a way that they will run at their ends transversely toward their bottom. In this case, the slits become ever shorter in the direction toward the inside, as a result of which a corresponding decrease of flexibility of the material of the ball cup results in the direction of the inside.

FIG. 1 shows the ball cup 1 which is extruded from a thermoplastic plastic, especially polyamide. The ball cup has shaft 5 which joins into the head 11 of the cup. In the cup head 11, the spherically developed hollow space 4 has been accommodated into which the ball head 8 is inserted. The ball head 8 joins into the threaded bolt 9 by way of the collar 10 to which a bolt any other construction part may be screwed on. The hollow space 4 has such a dimension that the ball head 8 fits flush in place but may be turned in the hollow space 4 without clearance without difficulty and may be swivelled. The hollow space 4 joins the entrance opening 13 through which the ball head 8 is introduced into the hollow space 4. The transition from the hollow space 4 to the entrance opening 13 is made up by the annular restriction 12 which is disposed symmetrically to the hollow space 4 with a circular periphery. The diameter of the annular restriction 12 is slightly smaller than the diameter on the equator of the ball head 8 so that an inserted ball head 8 may not be taken out of the hollow space 4 without difficulty. During insertion of the ball head 8 into the hollow space 4, said ball head 8 must force itself over the annular restriction 12.

In order to give the cup head 11 the necessary flexibility for the introduction and removal of the ball head 8 in the area of the annular restriction 12, slits 2 disposed symmetrically to the hollow space 4 and substantially in longitudinal direction of the shaft 5 have been provided which extend substantially centrically around the hollow space 4 and encompass the latter so far that the bridges 14 which have remained standing between the slits 2 and the annular restriction 12 will have a sufficient flexibility. For this flexibility, the distance of the slits 2 from the annular restriction 12 is also responsible. On the basis of the position and length of the slits 2, this flexibility of the bridges 14 is such that, in the case of the insertion of the ball head 8 or its removal, the extent of the annular restriction 12 which takes place in a radial direction, is large enough always to let the equator of the ball head pass through. In the case of this flexibility load of the annular restriction 12, there occur two effects, namely on the one hand an enlargement of the diameter of the annular restriction in the longitudinal direction of the shaft 5 and on the other hand an enlargement of this diameter also in transverse direction to the shaft 5. The latter extension is made possible largely through the fact that the material of the annular restriction will be sufficient toward the outside and compresses the slits 2. In the direction of the longitudinal extent of the shaft 5 however, such an extension is not possible, since the areas 15 and 16 of material which have remained standing between the ends of the slits 2, have no possibility to escape in the direction toward the slits, since there are no slits in these areas. Consequently, in the case of an escape of the material areas 15 and 16 for the purpose of allowing the equator to pass, the bridges 14 will be stretched, which they may also be expected to do on the basis of their position and length. Based on the tension closing in a manner of a ring in the annular restriction, the holding tension acting on one inserted ball head however is particularly strong so that with this construction a particularly safe support of the ball head 8 in the cup head 11 is guaranteed.

As becomes clear from FIGS. 1 and 2, the shaft 5 is provided with a trough-shaped longitudinally directed recess 3 which, at its end opposite to the cup head 11, is provided with the restriction 6. The bar 7 is inserted into the recess 3, which bar is held by the restriction 6 in a tight fitting manner (see FIG. 4). On the basis of the restriction 6, one will ascertain that the bar 7 inserted into the recess 3 will be held in said recess 3. The restriction 6 at the same time has slants 17 to be widened to the outside which facilitate the insertion of the bar 7 which consists of any kind of round metal.

The bar 7 terminates on its end facing away from the restriction 6 in the abutment constituted by the peg 18, behind which abutment, the spiral spring 19 has been placed which, under tension and by way of the abutment formed by the peg 18, forces the bar 3 in the direction toward the cup head 11. On its end facing away from the abutment 18, the spring 19 presses against the stop 20 formed by the restriction 6. Under the action of the spring 19 being under tension, the latter presses the abutment 18 away from the stop 20, until the front side of the bar 7 runs up against the end 21 of the recess 3.

By this construction, one will ascertain that a force acting in the direction of the arrow drawn in FIG. 1, will be absorbed whenever said force overcomes the tension of the spring 19. In this case, the spiral spring 19 will be compressed which results in a possibly necessary compensation of length.

The view of the front side of the shaft 5 represented in FIG. 4, shows clearly the overreaching of the restriction 6 over the equator of the round bar 7, so that the latter after being pressed into the recess 3, can no longer drop out.

FIG. 4 shows furthermore the lid 22 with which the recess 3 is covered up. The lid may be attached, for example, by gluing or welding to the walls 23 of the shaft 5.

Whenever one wants to concentrate the flexibility of the material in the area of the bridges 14 particularly to the surface of the cup head 11, which will benefit the strength of the support of the ball head 8 in the hollow space 4, then it will be possible to give the slits 2 a form which is slanted or rounded toward the inside, as illustrated in FIG. 5. From this figure, which shows a cut along the line V—V from FIG. 2 and which thus represents a developed view, it becomes clear that toward the inside, the ends of the slit run slantingly as a result of which there occurs a corresponding increase of strength of the material of the cup head 11 against stress load.

Inasmuch as the present invention is subject to many variations, modification and changes in details, it is intended that all matter contained in the foregoing description or shown in the accompanying drawing shall be interpreted as illustrative and not in a limiting sense.

What is claimed is:

1. A ball cup for a ball bearing comprising a ball cup body having a spherically formed ball-receiving chamber and said chamber having an annular restricted entrace whose diameter is less than the maximum diameter of said chamber and extending along the whole circumference of said chamber, said ball cup body having formed therein a pair of diametrically opposing spaced arcuate slits which substantially surround said chamber and restricted entrance concentrically, and said slits defining with said restricted entrance a pair of arcuate bridge elements which are coextensive with said slits circumferentially of the chamber and restricted entrance, said bridge elements having their circumferential ends connected to said ball cup body and being elongated and radially narrow and therefore are yielding and somewhat stretchable radially and along their circumferential lengths, whereby a non-yielding ball bearing possessing substantially the maximum diameter of said chamber may pass through the restricted entrance and will be securely retained by the restricted opening within said chamber, said ball cup body having a flat surface lying in a plane parallel to said restricted entrance and spaced therefrom in a direction away from the center of said chamber, and the ball cup body having a tapered surface formed from said flat surface extending along the whole circumference of said chamber and being concentric with and leading to the restricted entrance and forming a guideway for the ball bearing being passed through the restricted entrance and said ball cup body being formed from a somewhat yielding plastics material.

2. A ball cup for a ball bearing as defined in claim 1, and an elongated shaft fixed to the ball cup body and extending radially thereof along an axis which is generally disposed longitudinally of the longitudinal axes of said slits, said shaft having a longitudinal recess, a bar disposed in said recess of said shaft, one end of said bar bearing on a flat side surface of the ball cup body which is spaced radially from said chamber, an expansible coil spring surrounding said bar within the recess of the shaft and having one end bearing against an end wall of the shaft and its other end bearing against an abutment element of said bar, whereby said bar exerts a yielding radial compressive force on the ball cup body.

3. A ball cup for a ball bearing comprising a ball cup body having a spherically formed ball-receiving chamber and said chamber having an annular restricted entrance whose diameter is less than the maximum diameter of said chamber and extending along the whole circumference of said chamber, said ball cup body having formed therein a pair of diametrically opposing spaced arcuate slits which substantially surround said chamber and restricted entrance concentrically, and said slits defining with said restricted entrance a pair of arcuate bridge elements which are coextensive with said slits circumferentially of the chamber and restricted entrance, said bridge elements having their circumferential ends connected to said ball cup body and being elongated and radially narrow and therefore are yielding and somewhat stretchable radially and along their circumferential lengths, whereby a non-yielding ball bearing possessing substantially the maximum diameter of said chamber may pass through the restricted entrance and will be securely retained by the restricted opening within said chamber an elongated shaft fixed to the ball cup body and extending radially thereof along an axis which is generally disposed longitudinally of the longitudinal axes of said slits, said shaft having a longitudinal recess, a bar disposed in said recess of said shaft, one end of said bar bearing on a flat side surface of the ball cup body which is spaced radially from said chamber, an expansible coil spring surrounding said bar within the recess of the shaft and having one end bearing against an end wall of the shaft and its other end bearing against an abutment element of said bar, whereby said bar exerts a yielding radial compressive force on the ball cup body and the recess of said shaft being a trough-like recess extending substantially for the full length of the shaft, a yielding detent means on the shaft at its end remote from the ball cup and serving to retain said bar in assembled relationship with the shaft and also forming an abutment surface for the adjacent end of said spring, and a cover member for said trough-like recess on said shaft.

* * * * *